United States Patent [19]

Furukawa et al.

[11] Patent Number: 5,615,578
[45] Date of Patent: Apr. 1, 1997

[54] HYDRAULIC PRESSURE CONTROL SYSTEM FOR HYDRAULICALLY OPERATED VEHICLE TRANSMISSION

[75] Inventors: Hideo Furukawa; Tatsuyuki Ohashi, both of Wako, Japan

[73] Assignee: Honda Giken Kogyo Kabushiki Kaisha, Tokyo, Japan

[21] Appl. No.: 575,326

[22] Filed: Dec. 20, 1995

[30] Foreign Application Priority Data

Dec. 28, 1994 [JP] Japan .................................. 6-339953

[51] Int. Cl.$^6$ .................................................. F16H 61/04
[52] U.S. Cl. .......................................................... 74/336 R
[58] Field of Search ........................... 74/336 R; 477/125

[56] References Cited

U.S. PATENT DOCUMENTS

| | | | |
|---|---|---|---|
| 4,660,441 | 4/1987 | Young | 74/336 R |
| 4,785,689 | 11/1988 | Iwatsuki et al. | |
| 4,860,607 | 8/1989 | Numazawa et al. | 74/336 R |
| 4,870,877 | 10/1989 | Hasegawa et al. | |
| 5,109,731 | 5/1992 | Iwatsuki et al. | 477/125 |
| 5,109,734 | 5/1992 | Fujiwara | 477/125 |
| 5,400,670 | 3/1995 | Yamatani et al. | 74/336 R |
| 5,469,754 | 11/1995 | Sakai et al. | 74/336 R |

FOREIGN PATENT DOCUMENTS

| | | |
|---|---|---|
| 3843101 | 7/1989 | Germany . |
| 60-231056 | 11/1985 | Japan . |
| 2213220 | 8/1989 | United Kingdom . |

*Primary Examiner*—Dirk Wright
*Attorney, Agent, or Firm*—Armstrong, Westerman. Hattori, McLeland & Naughton

[57] ABSTRACT

A hydraulic pressure control system for a frictional engagement element such as clutches for a vehicle automatic transmission. The engagement state of the clutches, i.e., the normality of clutch state or operation is discriminated by detecting the degree of clutch engagement (clutch slippage), specifically by calculating a ratio between the input rotational speed and the output rotational speed, and by comparing the calculated ratio with the gear ratio designated by the shift command at that time. When the clutch is found to be normal, the hydraulic pressures on the releasing and engaging clutches are controlled for temporarily bringing the total torque transferred by the two clutches below the transmission input torque, i.e., for reducing the co-engagement amount to the required minimum. On the other hand, when it is ascertained that the clutch is not normal, the hydraulic pressures of the two clutches are controlled in a conventional manner.

5 Claims, 4 Drawing Sheets

HYDRAULIC PRESSURE CONTROL SYSTEM FOR HYDRAULICALLY OPERATED VEHICLE TRANSMISSION

BACKGROUND OF THE INVENTION

1. Field of the Invention

This invention relates to a hydraulic pressure control system for a hydraulically operated vehicle transmission, more particularly to a hydraulic pressure control system for a hydraulically operated vehicle automatic transmission which discriminates or estimates whether frictional engaging elements such as clutches are normal, and controls the supply of hydraulic pressure to the frictional engaging elements based on the result of the discrimination, thereby obtaining optimum gearshift characteristics.

2. Description of the Prior Art

The hydraulically operated vehicle automatic transmission has multiple clutches, brakes and other such frictional engaging elements which are engaged by the hydraulic pressure (oil) (Automatic Transmission Fluid). The transmission performs gear shifting, i.e., switches between frictional engaging elements, by releasing (disengaging) one element and engaging another. For preventing unexpected shock during gear shifting, it is necessary to control the co-engagement amount of the two (releasing and engaging) frictional engaging elements.

The co-engagement amount of the elements is, however, extremely difficult to optimize. A particular problem is that when the co-engagement amount is too small, the engine suddenly revs and produces a large gearshift shock. The practice adopted to avoid this has been to prevent revving of the engine during gear shifting by setting the co-engagement amount to a relatively high level at which the total amount of torque transferred by the engaging and releasing elements is greater than the amount of torque input to the transmission.

The slight interlock state this produces in the transmission causes a drop in the transmission output shaft torque. Since this feels like an engine braking effect to the driver, particularly when the drop is amplified by change in the oil temperature or by the aging of the transmission elements, it degrades drivability.

One example of a technology for accurately controlling clutch hydraulic pressure is disclosed in Japanese Laid-Open Patent Application No. Sho 60(1985)-231,056, which is provided with linear solenoid valves, duty solenoid valves or other such solenoid valves for controlling hydraulic clutch pressure. More specifically, it controls the hydraulic pressure applied to the clutches through solenoid valves so as to regulate the rotational speed of a member, such as the transmission input shaft, whose rotational speed changes during gear shifting to follow a desired change rate.

When this technology is applied, for example, to conduct clutch hydraulic pressure control for lowering the co-engagement amount of the clutches so as to temporarily reduce the transmission input torque to a level at which the total amount of the torques transferred by the engaging and releasing clutches does not produce a large drop in the output torque or revving of the engine, it becomes important to discriminate or estimate whether or not the clutches are normal, specifically, for example, whether or not the hydraulic pressures applied thereto are excessively lower or higher than desired, more specifically, whether or not the clutches are good (condition) in torque transmission amount or capacity and suitable for the intended control. The prior art mentioned above gives no consideration to this point.

An object of this invention is therefore to overcome the aforesaid shortcoming of the prior art by providing a hydraulic pressure control system for a hydraulically operated vehicle transmission which discriminates or estimates in a simple manner whether or not frictional engaging elements are normal, and based on the result, conducts hydraulic pressure control to prevent occurrence of gearshift shock without engine revving, thereby achieving good gearshift characteristics and enhancing drivability.

SUMMARY OF THE INVENTION

This invention achieves this object by providing a system for controlling hydraulic pressure for a hydraulically operated vehicle transmission, including, a plurality of frictional engaging elements installed in the vehicle transmission, a hydraulic pressure supplying circuit for discharging hydraulic pressure from one of said plurality of frictional engaging elements and for supplying hydraulic pressure to another of said plurality of frictional engaging elements to bring them into operation such that gear shifting is effected in the vehicle transmission in response to a gearshift command, shaft rotational speed detecting means for detecting a rotational speed of a shaft input to said vehicle transmission which changes at a time of said gear shifting, hydraulic pressure control means for controlling the hydraulic pressure such that the rotational speed of the shaft changes following a desired value. In the system, engaging state discriminating means is provided for discriminating an engaging state of said one of the plurality of frictional engaging elements when gear shifting is being effected from the one to the another, and inhibiting means is provided for inhibiting said hydraulic pressure control means from controlling the hydraulic pressure in response to a result of discrimination.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
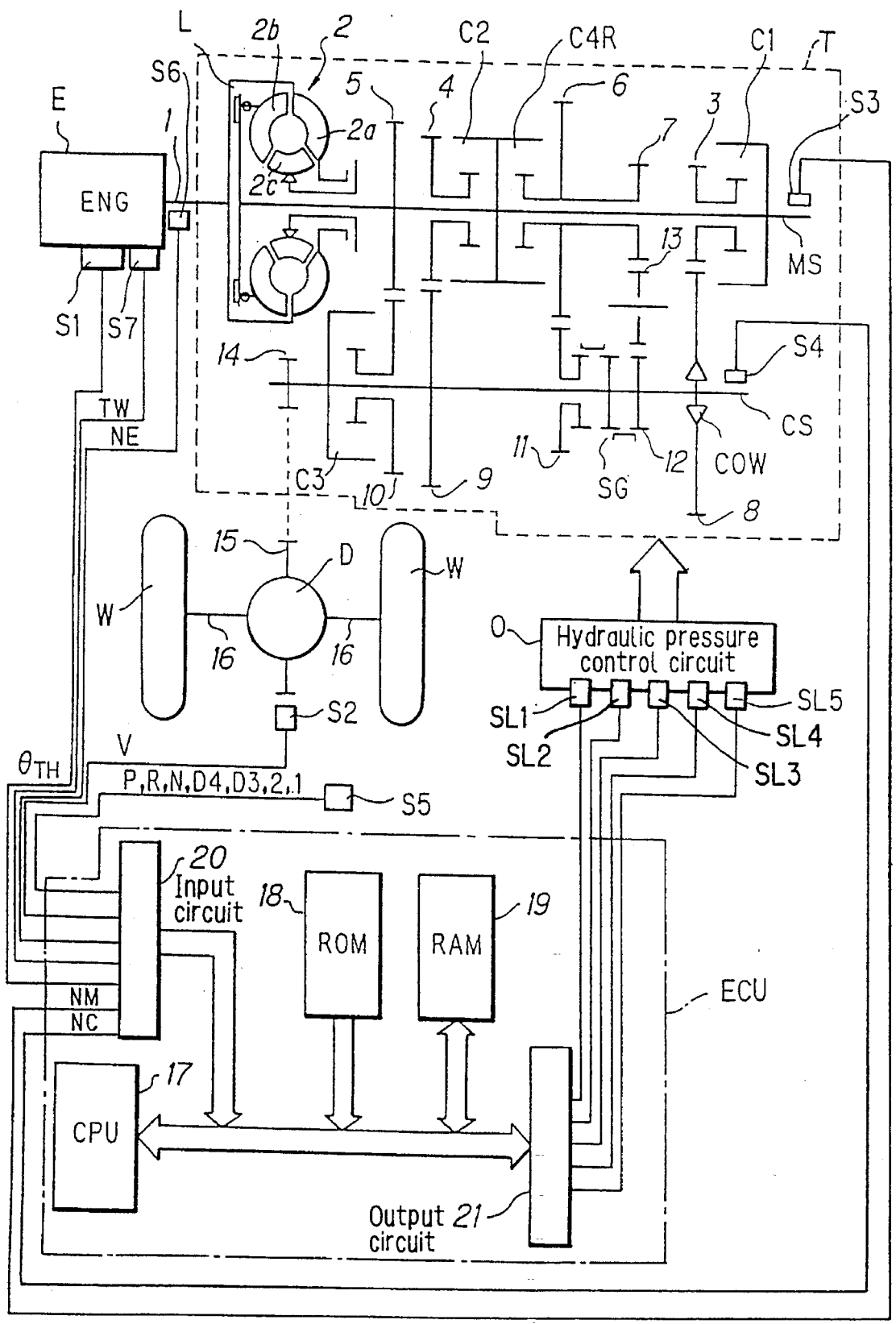
FIG. 1 is an overall view of the hydraulic pressure control system for a hydraulically operated vehicle transmission.

FIG. 1 is an overall view of the hydraulic pressure control system for a hydraulically operated vehicle transmission according to the invention.

As shown in FIG. 1, a vehicle automatic transmission T is equipped with a main shaft MS connected with a crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second-fourth gears, the counter first-speed gear 8 is supported by a one-way clutch COW. The second gear is established when the main second-speed gear 4 rotatably supported on the main shaft MS is connected with the main shaft MS by a second-speed hydraulic clutch C2. The third gear is established when the counter third-speed gear 10 rotatably supported on the countershaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R. The reverse gear is established when the counter reverse gear 12 rotatably supported on the countershaft CS is connected with the countershaft CS by the selector gear SG and with this state maintained the main reverse gear 7 rotatably supported on the main shaft MS is connected with the main shaft MS by the fourth-speed reverse hydraulic clutch C4R. The clutches C1, C2, C3 and C4R are the aforesaid frictional engaging elements.

The rotation of the countershaft CS is transmitted through a final drive gear 14 and a final driven gear 15 to a differential D, from where it is transmitted to driven wheels W, W through left and right drive shafts 16, 16.

A throttle position sensor S1 is provided in an air intake pipe (not shown) of the engine E at a point in the vicinity of a throttle valve (not shown) for detecting the degree of opening or position θTH of the throttle valve. A vehicle speed sensor S2 for detecting the vehicle traveling speed V from the rotational speed of the final driven gear 15 is provided in the vicinity of the final driven gear 15. A transmission input shaft speed sensor S3 is provided in the vicinity of the main shaft MS for detecting the rotational speed NM of the transmission input shaft from the rotation of the main shaft MS, and a transmission output shaft speed sensor S4 is provided in the vicinity of the countershaft CS for detecting the rotational speed Nc of the transmission output shaft from the rotation of the countershaft CS.

A shift lever position sensor S5 is provided in the vicinity of a shift lever (not shown) installed on the vehicle floor near the driver's seat. The shift lever position sensor S5 detects which of the seven positions P, R, N, D4, D3, 2, 1 has been selected by the driver. A crank angle sensor S6 is provided in the vicinity of the crankshaft 1 of the engine E for detecting the engine speed NE from the rotation of the crankshaft 1, and a coolant temperature sensor S7 for detecting the engine coolant temperature TW is provided at an appropriate location on a cylinder block (not shown) of the engine E. Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1, etc., are input to the microcomputer through the input circuit 20. The CPU 17 of the microcomputer determines the gear (gear ratio or position) and energizes/deenergizes shift solenoids SL1, SL2 of a hydraulic control circuit O via the output circuit 21 so as to switch shift valves (not shown) and thereby engage/disengage the hydraulic clutches of prescribed gears, and further controls the operation of the lockup clutch L of the torque converter 2 via control solenoids SL3 and SL4.

As will be explained later, the CPU 17 also controls the clutch hydraulic pressure by controlling a linear solenoid SL5. The CPU 17 controls the solenoid SL5 through PWM (duty-ratio control).

Figure 2:
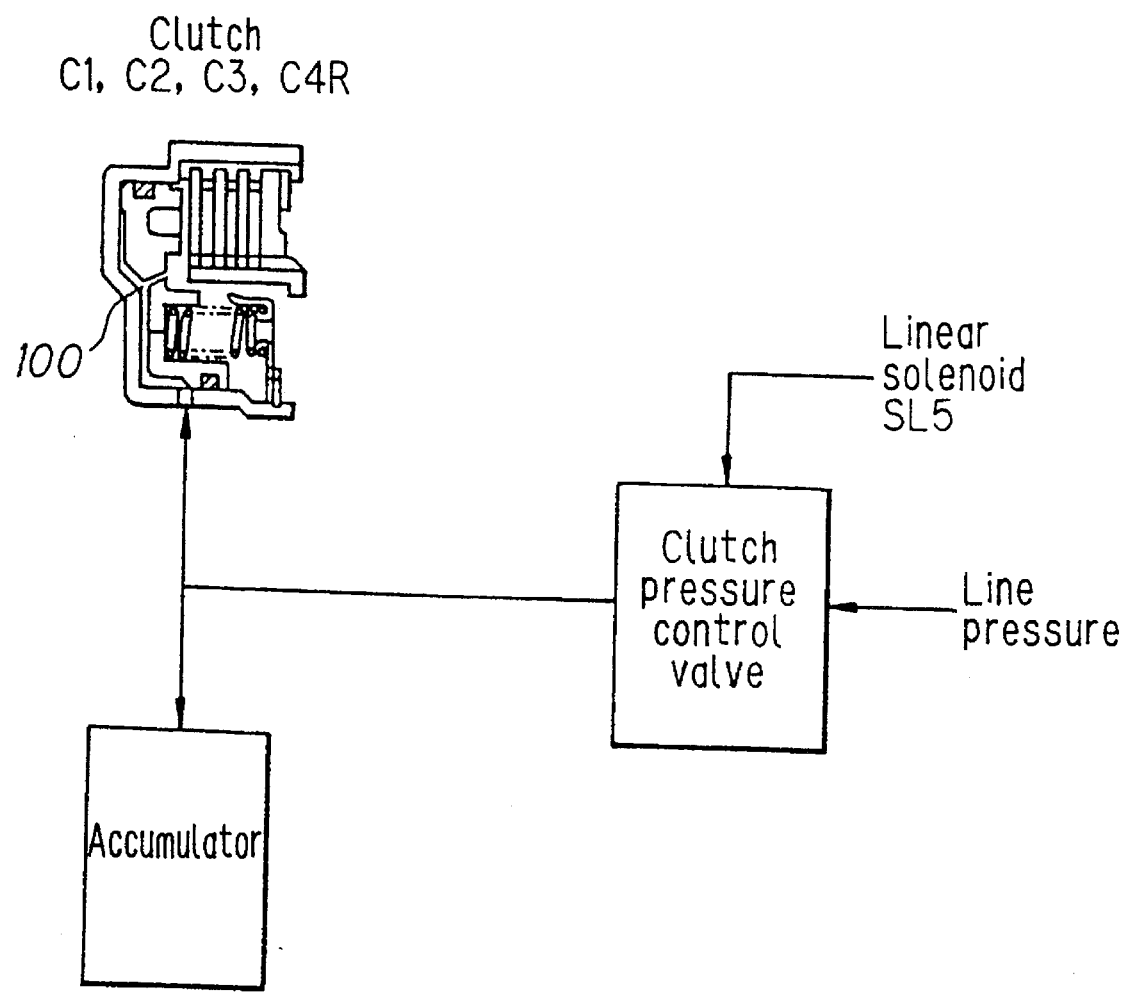
FIG. 2 is an explanatory view showing a part of the hydraulic control circuit of the system illustrated in FIG. 1.

FIG. 2 is an explanatory view showing a part of the hydraulic pressure control circuit O of the system of FIG. 1. Line pressure (primary pressure) supplied from a hydraulic pressure source (not shown) is regulated by the aforesaid linear solenoid SL5 and is sent to a clutch pressure control valve. The clutch pressure control valve regulates the line pressure within a prescribed throttle pressure range and supplies it to the clutches C1, C2, C3 and C4R. An accumulator is provided in the path to absorb surge pressure.

Thus, the CPU 17 regulates the line pressure by using the linear solenoid SL5 to control the clutch pressure control valve so that the pressures supplied to the clutches are controlled to the desired values. As shown in FIG. 2, each of the clutches C1, C2, C3 and C4R is provided with a clutch valve 100 for discharge of centrifugal hydraulic pressure. Centrifugal pressure is discharged at the time of clutch release.

As pointed out earlier, it is important to discriminate or estimate whether the state or operation of the clutches is normal at the start of clutch hydraulic pressure control. By "normal" it is meant that not only the clutches, but also the shift valves, hydraulic pressure source and the like required for clutch engagement are all in an undamaged state and are able to function as desired, in other words, good (condition) in torque transmission amount or capacity for the intended control.

For that purpose, therefore, the input and output rotational speeds NM, NC are detected and the ratio therebetween (called "Gratio") is calculated as:

Gratio=input rotational speed NM/output rotational speed NC.

Thus, in the embodiment, whether or not the clutch state or operation is normal (i.e., good (condition) in torque transmission amount or capacity for the intended control) is discriminated or estimated by detecting the degree of clutch engagement (clutch slippage), specifically by comparing the calculated value Gratio with the gear ratio of the gear designated by the shift command at that time.

More specifically, as will be explained later in detail with reference to FIG. 4, a discrimination is made as to whether or not the calculated Gratio is in the range defined by an upper limit value YGRHEnH and a lower limit value YGRHEnL obtained by adding a prescribed value to the gear ratio (GR(n)) of each of the first to fourth gears and the reverse gear (here n:gear; the reverse gear is indicated as 5). Time counters are prepared for each gear (gear position) and the value of a time counter concerned is incremented by 1 when it is and is decremented by 1 when it is not.

The time counter for the first gear clutch C1 is designated as TM1STBC, for the second gear clutch C2 as TM2NDBC, for the third gear clutch C3 as TM3RDBC, for the fourth gear clutch C4R as TM4THBC, and for the reverse gear (which shares the fourth gear clutch C4R) as TM5BC. The general designation for the time counters is TMBC.

The clutch is discriminated to be normal when the time counter value TMBC concerned reaches a prescribed value, which is set at 20 (corresponding to 200 ms) in this embodiment. This is because the operating state can be assumed to have stabilized indicating that no excessive clutch slippage occurs when Gratio stays in the aforesaid prescribed range for a period of 200 ms. It can therefore be stated that the clutches are discriminated to be better (condition) for the intended control with decreasing slip-page.

However, There is a problem in the discrimination. That is, when the vehicle is traveling in a low gear (e.g., first gear) at a very low speed of, say, at or below 8 km/h, it may be impossible to detect the output rotational speed accurately. In the type of the transmission according to this embodiment, moreover, the first gear transmission system includes a one-way engaging mechanism (the one-way clutch COW) which transmits torque only from the transmission input shaft side and permits the output side to overrun.

As a result, when the gear is positioned at 1st and the engine braking effect is in progress such that the transmission is driven by the driven wheels W, the one-way clutch rotates freely and there is no transmission of power. Transmission of power occurs only when the engine drives the wheels W. In other words, the one-way clutch COW locks when its input side is rotating faster than its output side and is able to transmit power. Therefore, when the vehicle is traveling in first gear such that the one-way clutch COW may not be locked, or when the vehicle is running at the aforesaid very low speed, the discrimination based on the ratio Gratio is apt to be inappropriate owing to the indeterminacy of the ratio between the input and output rotational speeds.

In such cases, a simplified procedure is adopted in which the time counter of the gear designated by the shift command is incremented by 1, the other time counters are decremented by 1 and the clutch state is discriminated from the time lapse since the shift command. In this case, too, and for the same reason as explained above, the clutch is determined to be normal when the time counter value TMBC reaches the prescribed value, i.e. after the passage of 200 ms. Thus, it can be stated that the clutches are discriminated to be better with increasing time lapse.

The operation of the hydraulic pressure control system for a hydraulically operated vehicle transmission according to the invention will now be explained with reference to the flowchart shown in FIG. 3. This program is activated once every 20 ms.

The program starts at S10, in which an appropriate flag is checked to determine whether gear shifting is in progress, i.e., whether a gearshift command has been issued. When the result is NO, the program is immediately terminated. When it is YES, the program goes to S12, in which the time counter values TMBC are calculated.

Figure 4:
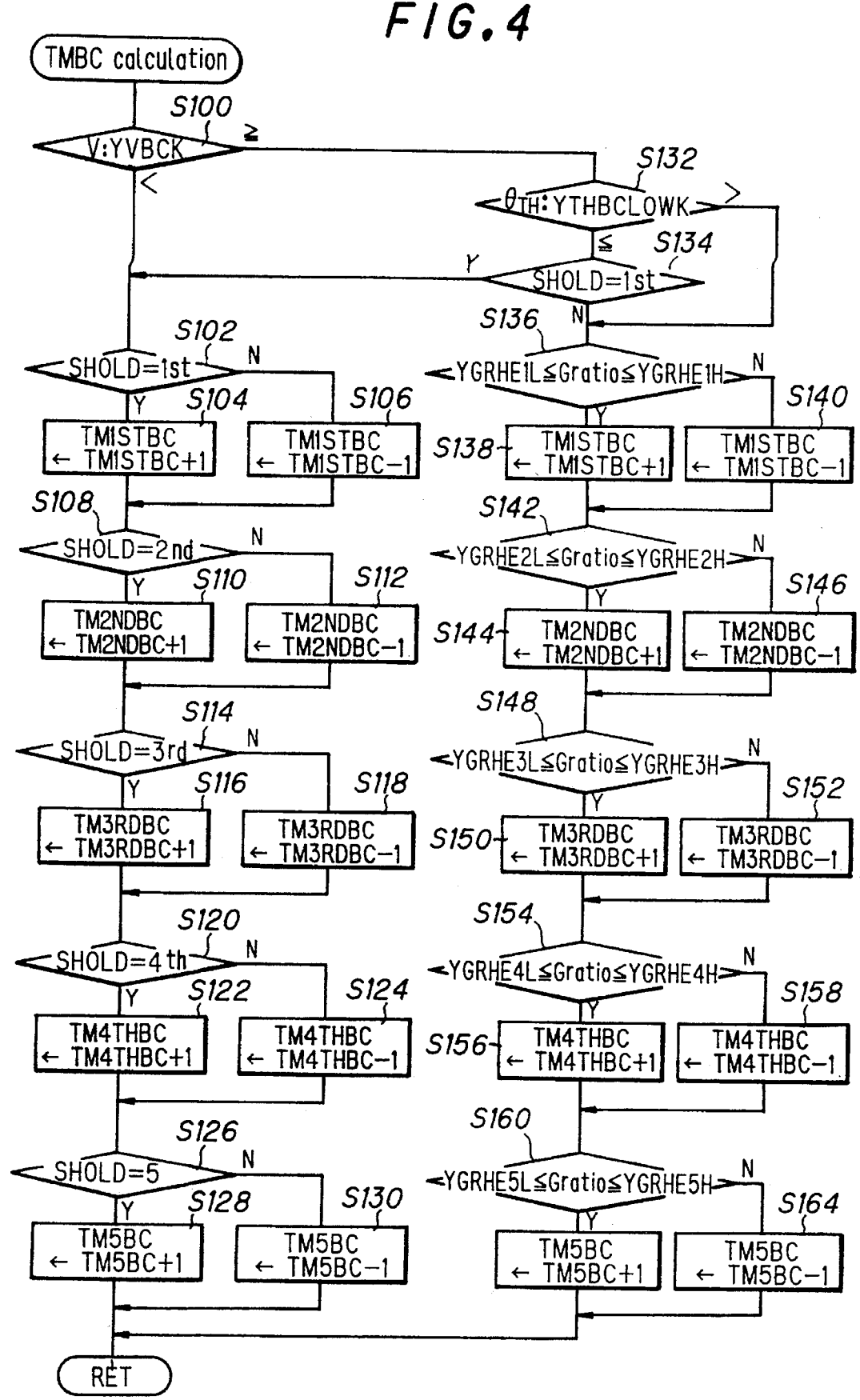
FIG. 4 is a flowchart showing the subroutine of calculating time counter values referred to in FIG. 3.

The subroutine for this is shown by the flowchart in FIG. 4 and starts with S100, in which the detected vehicle speed V is compared with a prescribed vehicle speed YVBCK (the aforesaid very low speed of, for example, 8 km/h).

When the vehicle speed V is found to be lower than the prescribed vehicle speed YVBCK, then, for incrementing/decrementing the time counter concerned based on the gear (position) currently designated by the gearshift command, the program goes to S102, in which it is checked whether the current gear (illustrated as SHOLD in the figure) is 1st and, when it is, to S104, in which the value of the time counter TM1STBC for the first gear clutch C1 is incremented by 1, and, when it is not, to S106, in which the value of the same time counter is decremented by 1.

The program then advances to S108, in which it is checked whether the current gear is 2nd, and, when it is, to S110, in which the value of the time counter TM2NDBC for the second gear clutch C2 is incremented by 1, and, when it is not, to S112, in which the value of the same time counter is decremented by 1.

The program then advances to S114, in which it is checked whether the current gear is 3rd, and, when it is, to S116, in which the value of the time counter TM3RDBC for the third gear clutch C3 is incremented by 1, and, when it is not, to S118, in which the value of the same time counter is decremented by 1.

The program then advances to S120, in which it is checked whether the current gear is 4th, and, when it is, to S122, in which the value of the time counter TM4THBC for the fourth gear clutch C4R is incremented by 1, and, when it is not, to S124, in which the value of the same time counter is decremented by 1. Thus, the procedures in S102 to S130 correspond to measure the time lapse since the gearshift command.

The program then advances to S126, in which it is checked whether the vehicle is currently running in reverse gear (this is indicated as SHOLD=5 in the figure), and, when it is, to S128, in which the value of the time counter TM5BC for the reverse gear clutch (which shares the fourth gear clutch C4R) is incremented by 1, and, when it is not, to S130, in which the value of the same time counter is decremented by 1.

On the other hand, when S100 finds that the vehicle speed V is equal to or higher than the prescribed vehicle speed YVBCK, the program goes to S132, in which the detected throttle opening θTH is compared with a prescribed throttle opening YTHBCLOWK of, for example, (⅛×WOT (fully opened) degrees). The prescribed throttle opening YTHBCLOWK is set to the value at which the torque transmitted from the engine causes the one-way clutch COW to lock.

When S132 finds that the detected throttle opening θTH is equal to or smaller than the prescribed throttle opening YTHBCLOWK, the program goes to S134, in which it is checked whether the current gear is 1st. When the result in S134 is YES, the one-way clutch COW may not be locked and, therefore, the program proceeds through S102 and the following steps, in which the value of the time counter for the first gear clutch is incremented by 1 and the value of the other time counters is decremented by 1.

When the result in S134 is NO, the gear is one other than first and the problem of one-way clutch COW is not involved. The program therefore proceeds through S136 and the following steps. (When S132 finds that the throttle opening θTH exceeds the prescribed throttle opening YTHBCLOWK, S134 is skipped because the operating principle precludes the possibility of the one-way clutch COW being free.)

In S136 through S164, it is checked whether the value Gratio calculated as the ratio between the input and output rotational speeds are within the aforesaid permissible ranges of the rated gear ratios GR(n) of the respective four forward gears and one reverse gear in FIG. 1, i.e., whether they are not lower than the lower limit value YGRHEnL and not higher than the upper limit value YGRHEnH (n: gear; reverse gear is defined as 5). When the result is YES, the value of the time counter for the clutch concerned is incremented by 1 and the value of the other time counters is decremented by 1.

Figure 3:
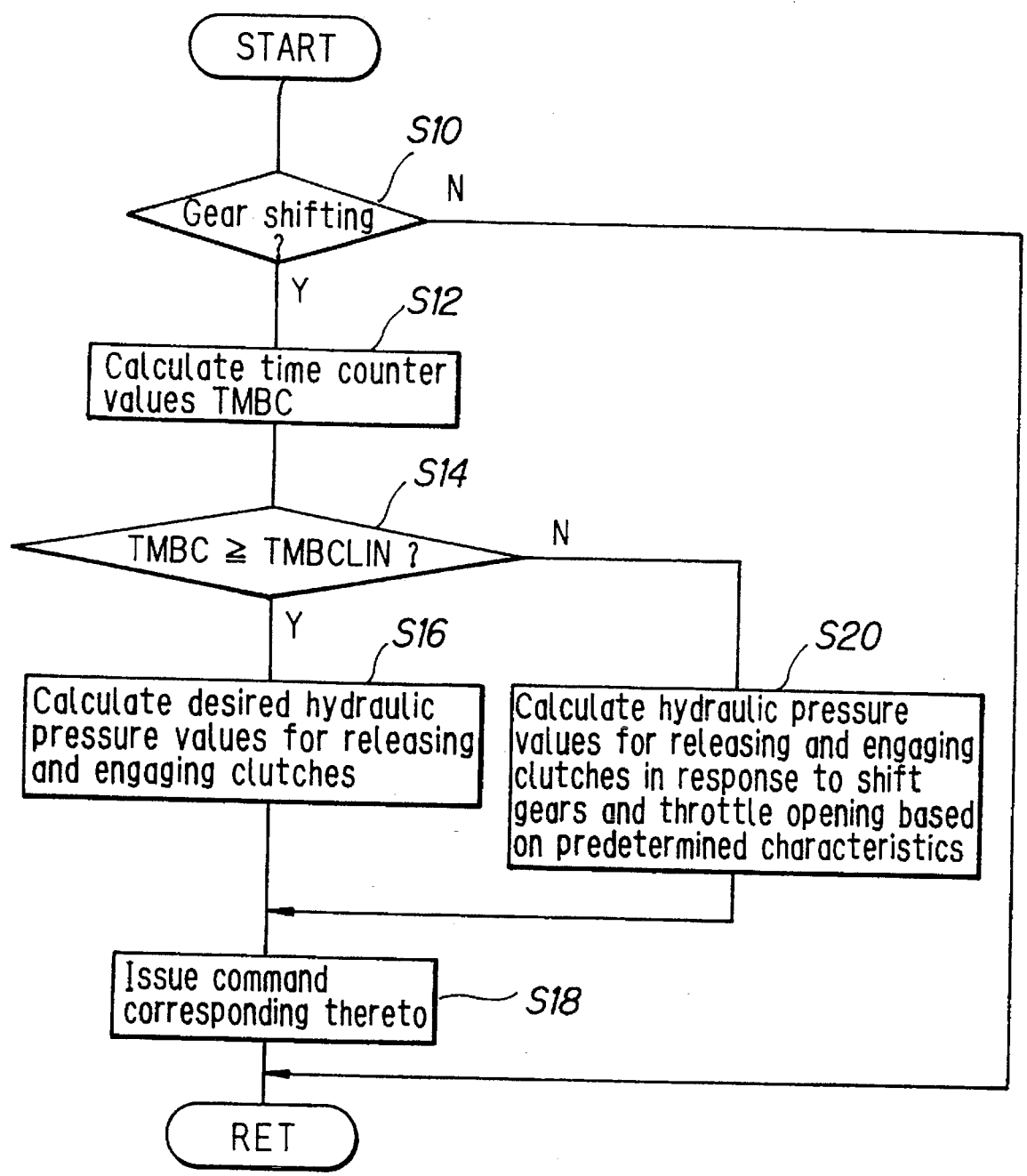
FIG. 3 is a flowchart showing the operation of the system illustrated in FIG. 1.

The program then goes to S14 of the flowchart of FIG. 3, in which the computed time counter value TMBC for the clutch to be released (the current gear clutch) is compared with a reference value TMBCLIN (corresponding to 200 ms). When the computed time counter value TMBC for the clutch to be disengaged is found to be equal to or greater than the reference value TMBCLIN, it is judged that the state or operation of the clutch is normal and the program goes to S16, in which the hydraulic pressure is controlled such that the rotational speed change of the input shaft follows a desired change rate value.

More specifically, the control for reducing the co-engagement amount is conducted by controlling the hydraulic pressure of the releasing (disengaging) clutch and the hydraulic pressure of the engaging clutch so as to temporarily bring the sum of the torques transferred by the two clutches below the transmission input torque. This control makes it possible to achieve good gearshift characteristics without engine revving or an excessive drop in output torque. The program then proceeds to S18, in which a corresponding command is issued to the linear solenoid SL5.

On the other hand, when S14 of FIG. 3 finds that the computed time counter value TMBC is smaller than the reference value TMBCLIN, it is judged that the clutch to be released is not normal and the program goes to S20, in which the aforesaid control is inhibited and the desired clutch hydraulic pressures are calculated by a conventional manner so as to achieve a predetermined hydraulic pressure appropriate for the shift gears (e.g., second gear to third gear, or third gear to fourth gear) and the throttle opening. The result is similarly output as a command in S18.

As in the prior art technique, in this case the hydraulic pressures of the releasing and engaging clutches are controlled to keep the total torque transferred by the two clutches larger than the transmission input torque TE at all times, i.e., so as to make the co-engagement amount relatively large. The resulting gearshift therefore produces a large drop in output torque but does not cause engine revving.

Specifically, a judgment in S14 that the time counter value has not reached the reference value means that the same state has not continued for a period corresponding to the reference value, making it impossible to confirm that the clutch is normal. In this case, it is therefore possible that the clutch on the release side is slipping excessively, so that the engine may suddenly rev if control should be conducted for reducing the co-engagement amount.

Therefore, as explained in the foregoing, in this embodiment the rated gear ratio of the transmission and the gear ratio calculated from the actual input and output rotational speeds of the transmission (i.e., the gear ratio showing the actual state of the transmission) are compared every time the program of FIG. 3 is actuated. When they are the same, the time counter value of the clutch concerned is incremented by 1 and the other time counter values are decremented by 1.

In other words, since the number of times that (time period over which/ the gear ratio designated by the gearshift command and the actual gear ratio coincide is determined and the discrimination is conducted based on the result, the clutch state can be detected with high accuracy. The degree of normality of the clutch (i.e., the clutch engaging amount or capacity) can thus be stated such that it increases as the computed value increases (more precisely, when it exceeds the reference value), i.e., as the slippage decreases or, in other words, when it is in the permissible range.

Moreover, since when the operational state such as running at a very low vehicle speed makes it difficult to ascertain the actual gear ratio the judgment is based on elapsed time at the gear designated by the gearshift command (time elapsed from the start of the gear shifting). The normality of the clutch can also be discriminated or estimated with good accuracy even under such conditions.

In addition, when the clutch is found to be normal, hydraulic pressures on the releasing and engaging clutches are controlled for temporarily bringing the total torque transferred by the two clutches below the transmission input torque. i.e., for reducing the co-engagement amount to the required minimum. As a result, it is possible to obtain good gearshift characteristics free from engine revving and excessive drop in output torque.

On the other hand, when it is ascertained that the state or operation of the clutch is not normal, the hydraulic pressures of the releasing and engaging clutches are controlled to keep the total torque transferred by the two clutches larger than the transmission input torque at all times. i.e., so as to make the co-engagement amount relatively large, thereby avoiding engine revving.

Therefor, the normality of the clutches can be discriminated in a sample manner and based on the result, the hydraulic pressure control can be conducted so as to prevent engine revving and occurrence of gearshift shock, thereby, achieving good gearshift characteristics and enhancing drivability.

While the invention has thus been shown and described with reference to the specific embodiments, it should be noted that the invention is in no way limited to the details of the described arrangements, and changes and modifications may be made without departing from the scope of the appended claims.

What is claimed is:

1. A system for controlling hydraulic pressure for a hydraulically operated vehicle transmission, including:

a plurality of frictional engaging elements installed in the vehicle transmission;

a hydraulic pressure supplying circuit for discharging hydraulic pressure from one of said plurality of frictional engaging elements and for supplying hydraulic pressure to another of said plurality of frictional engaging elements to bring them into operation such that gear shifting is effected in the vehicle transmission in response to a gearshift command;

shaft rotational speed detecting means for detecting a rotational speed of a shaft input to said vehicle transmission which changes at a time of said gear shifting;

hydraulic pressure control means for controlling the hydraulic pressure such that the rotational speed of the shaft changes following a desired value;

wherein the improvement comprises:

engaging state discriminating means for discriminating an engaging state of said one of the plurality of frictional engaging elements when gear shifting is being effected from the one to the another; and inhibiting means for inhibiting said hydraulic pressure control means from controlling the hydraulic pressure in response to a result of discrimination.

2. A system according to claim 1, wherein said discriminating means discriminates whether the engaging state of the frictional engaging element is normal at least based on either of a time lapse from the gearshift command or slippage of the frictional engaging element.

3. A system according to claim 2, wherein said discriminating means discriminates that the engaging state of the frictional engaging element is better with increasing time lapse from the gearshift command or with decreasing slippage of the frictional engaging element.

4. A system according to claim 2, wherein said discriminating means discriminates the engaging state of the frictional engaging element based on the time lapse from the gearshift command when vehicle speed is at or less than a prescribed speed.

5. A system according to claim 2, further including:

a one-way engaging mechanism that only allows transmission of power input by said input shaft; and determining means for determining whether said one-way engaging mechanism transmits power;

and said discriminating means discriminates the engaging state of the frictional engaging element based on the time lapse from the gearshift command when said determining means determines that said one-way engaging mechanism does not transmit power.

* * * * *